US 6,675,477 B2

(12) United States Patent
Kato et al.

(10) Patent No.: US 6,675,477 B2
(45) Date of Patent: Jan. 13, 2004

(54) METHOD FOR MANUFACTURING SPOOL VALVE

(75) Inventors: Keigo Kato, Aichi-ken (JP); Masataka Mizuno, Aichi-ken (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 10/301,251

(22) Filed: Nov. 21, 2002

(65) Prior Publication Data

US 2003/0070296 A1 Apr. 17, 2003

Related U.S. Application Data

(62) Division of application No. 09/876,783, filed on Jun. 7, 2001, now Pat. No. 6,520,210.

(30) Foreign Application Priority Data

Jun. 16, 2000 (JP) ........................................ 2000-181848

(51) Int. Cl.[7] ................................................. B23P 15/00
(52) U.S. Cl. ............................ 29/890.13; 29/890.126; 29/516
(58) Field of Search ....................... 29/890.13, 890.124, 29/890.126, 428, 509, 521, 515, 516; 137/625.69, 315.09

(56) References Cited

U.S. PATENT DOCUMENTS

| 139,463 A | | 6/1873 | Gibbs |
| 2,370,371 A | | 2/1945 | Pratt et al. |
| 2,471,285 A | | 5/1949 | Rice |
| 3,976,103 A | * | 8/1976 | Ostic ..................... 137/625.69 |
| 4,750,511 A | | 6/1988 | Henry et al. |
| 5,172,727 A | | 12/1992 | Stoll et al. |
| 5,289,634 A | * | 3/1994 | Makino et al. ......... 29/890.124 |
| 5,293,685 A | | 3/1994 | Meyer et al. |
| 5,392,516 A | * | 2/1995 | Mazhar ..................... 29/890.13 |
| 5,782,268 A | * | 7/1998 | Kato et al. ............. 137/625.69 |
| 6,061,906 A | * | 5/2000 | Kato et al. ................ 29/890.13 |
| 6,298,880 B1 | * | 10/2001 | Kakamu et al. ........ 137/625.48 |

FOREIGN PATENT DOCUMENTS

| DE | 1 092 739 | 11/1960 |
| DE | 26 45 327 | 4/1977 |
| EP | 0 786 307 A1 | 7/1997 |

* cited by examiner

Primary Examiner—I Cuda Rosenbaum
(74) Attorney, Agent, or Firm—Frishauf, Holtz, Goodman & Chick, P.C.

(57) ABSTRACT

A spool valve is provided which has a plurality of small-diameter portions formed at predetermined spacings on a peripheral surface of a shaft, and pairs of annular ridges on peripheral surfaces of the small-diameter portions to have a larger diameter than an inner diameter of collars. The collars are closely fitted between the annular ridges to make valve bodies, and the collars include an inner wall, an outer wall and at least one connection therebetween, and an annular gap is provided between the inner wall and the outer wall.

9 Claims, 5 Drawing Sheets

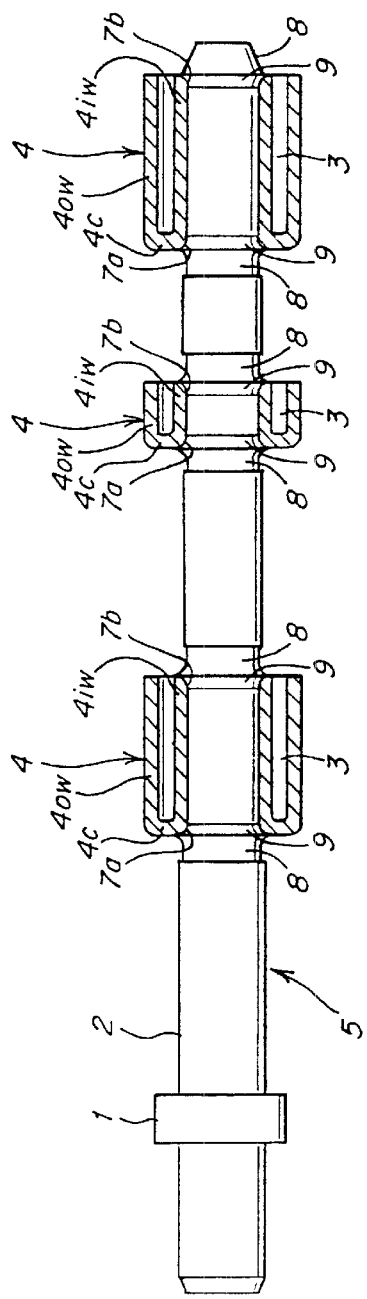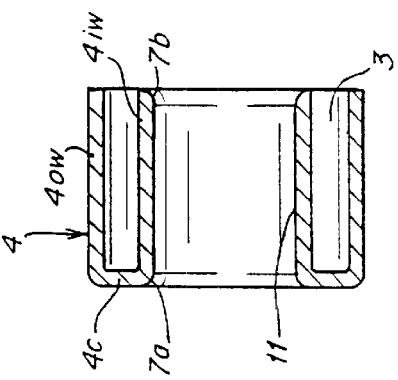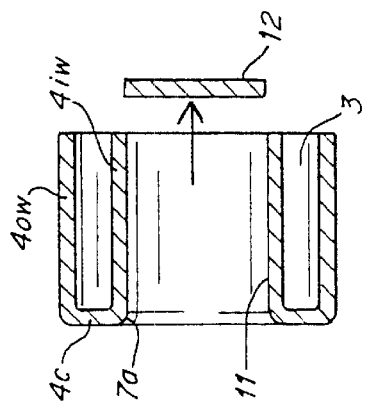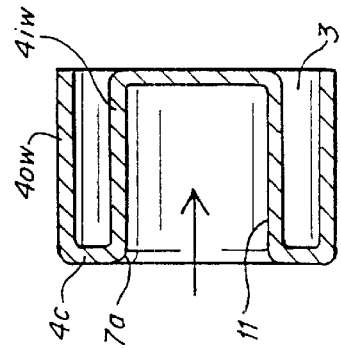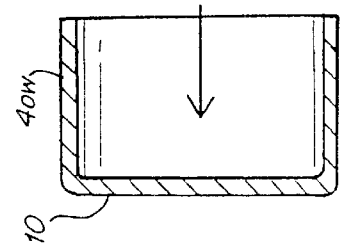
Fig. 1
Fig. 5
Fig. 4
Fig. 3
Fig. 2

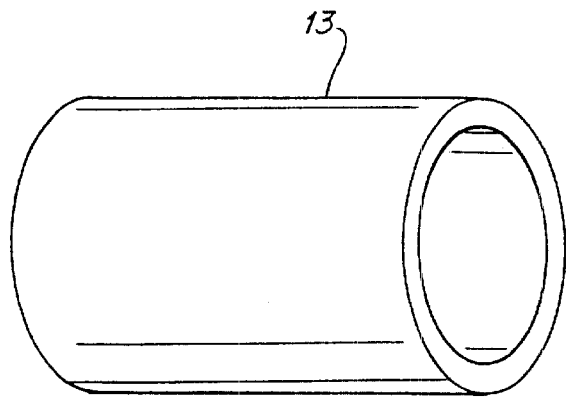
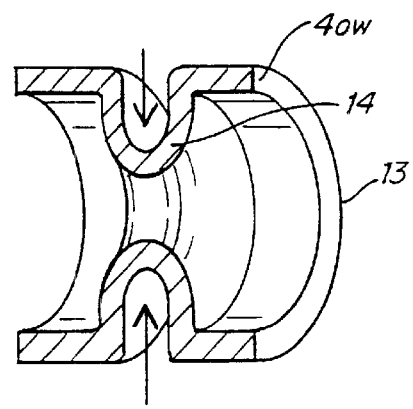
Fig. 6  Fig. 7
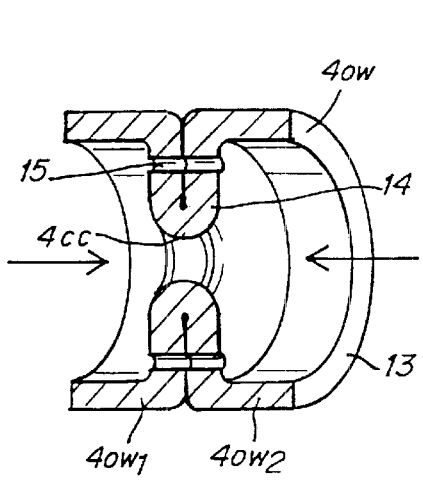
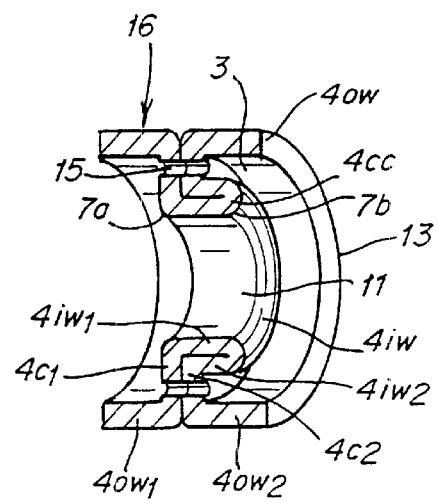
Fig. 8  Fig. 9

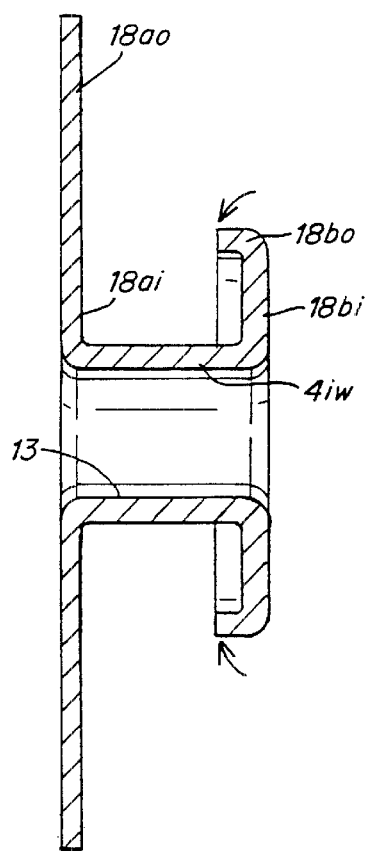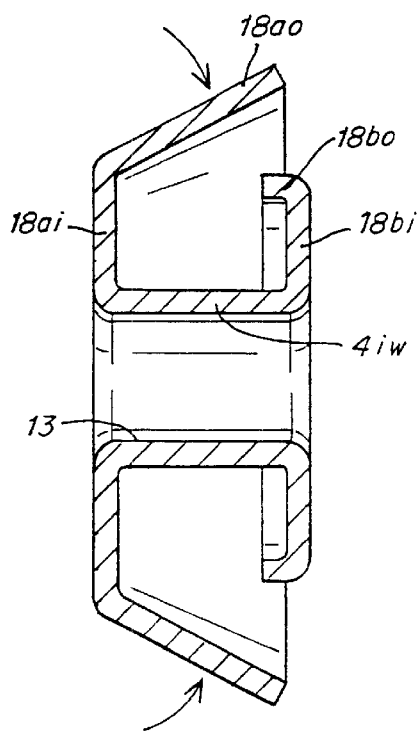
Fig. 16　　　Fig. 17
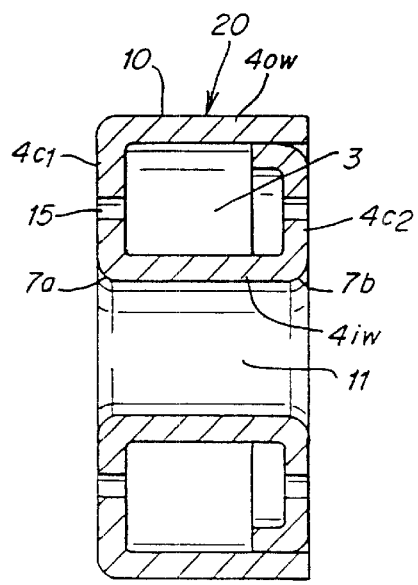
Fig. 18

METHOD FOR MANUFACTURING SPOOL VALVE

This is a Division of U.S. patent application Ser. No. 09/876,783 filed Jun. 7, 2001 now U.S. Pat. No. 6,520,210.

BACKGROUND OF THE INVENTION

The invention relates to a spool valve, such as oil valves and the like, incorporated into hydraulic control circuits of automatic transmissions of an automobile or the like to perform switching of oil flow passages.

Spool valves have been manufactured by machining a rod material by means of a lathe or the like, in which there are many problems. For example, there is much material discarded as chips, machining takes a long time and stress relief is essential in the case where application of heat treatment such as carburization or the like generates stress of heat treatment to distort a shaft.

To solve such problems, the inventors of the present application have devised, as disclosed in Japanese Provisional Patent Publication No. 9-264444, a spool valve, in which collars are fixed to a shaft by fitting a plurality of collars onto a shaft material in predetermined positions, and using a rolling die to reduce the shaft material at both ends of the collars in diameter to cause plastic flow of metal to form annular ridges.

However, such collars are manufactured in multi-stage processes by cold forging in a cold forging machine after shearing of a rod material to a predetermined length. It has been difficult to manufacture thin collars since in the case of manufacturing collars having a thickness as thin as, for example, 4 mm or less, a rod material cut by shearing causes deformation such as die wear or the like. Also, for the purpose of low fuel consumption in automobiles, it has been demanded to make a weight of an automobile as small as possible. Such collars involve, in addition to a problem that being a ring-shaped solid body, they are heavy, problems that provision of oil drain holes necessitates boring by a drill, which takes time and man-hour and the manufacturing cost is increased by waste of a material caused by punching a central hole in a rod material, which allows fitting onto a shaft.

SUMMARY OF THE INVENTION

The invention has been devised to solve the above mentioned problems of the prior art and enable manufacturing collars having a small thickness and to provide a spool valve provided with collars, which are lightweight and high in yield of material.

A spool valve according to the invention has a plurality of small-diameter portions formed at predetermined spacings on a peripheral surface of a shaft, and pairs of annular ridges on peripheral surfaces of the small-diameter portions to have a larger diameter than an inner diameter of collars, the collars being closely fitted between the annular ridges to make valve bodies, characterized in that the collars comprise an inner wall, an outer wall and at least one connection therebetween, the at least one connection is formed of the same material as that of the inner wall and outer wall, and connects the inner wall and the outer wall integrally to each other at predetermined positions on the inner wall and the outer wall, and an annular gap is provided between the inner wall and the outer wall. In addition, the collars can be used which are formed with oil drain holes, as desired.

Also, A method for manufacturing a spool valve, according to the invention, comprises the steps of: fitting onto a shaft material and aligning in predetermined positions a plurality of collars, which are manufactured by forming a metallic sheet and comprise an annular gap between an inner wall and an outer wall; and using a rolling die to reduce the shaft material around both ends of the respective collars in diameter to cause plastic flow of metal to form at both ends of the respective collars annular ridges having a larger diameter than an inner diameter of the collars to thereby fix the respective collars to the shaft. In addition, oil drain holes can be provided on the respective collars by punching, as desired.

BRIEF DESCRIPTION OF THE DRAWINGS

FIG. 1 is a partial, cross sectional view showing a spool valve provided with collars according to a first embodiment.

FIG. 2 is a cross sectional view showing a step (first drawing of a metallic sheet) of the manufacturing process according to the first embodiment.

FIG. 3 is a cross sectional view showing a step (second drawing of the metallic sheet) subsequent to the step shown in FIG. 2.

FIG. 4 is a cross sectional view showing a step (punching of the metallic sheet) subsequent to the step shown in FIG. 3.

FIG. 5 is a cross sectional view showing a collar according to the first embodiment.

FIG. 6 is a perspective view showing a step (preparation of a collar material) of the manufacturing process of a collar according to the second embodiment.

FIG. 7 is a fragmentary perspective view showing a step (formation of a constricted portion) subsequent to the step shown in FIG. 6.

FIG. 8 is a fragmentary perspective view showing a step (close attaching of the constricted portion) subsequent to the step shown in FIG. 7.

FIG. 9 is a fragmentary perspective view showing the collar according to the second embodiment.

FIG. 16 is a cross sectional view showing a step (first bending of flanges) of the manufacturing process of a collar according to a fifth embodiment.

FIG. 17 is a cross sectional view showing a step (second bending of the flanges) subsequent to the step shown in FIG. 16.

FIG. 18 is a cross sectional view showing a collar according to the fifth embodiment.

DESCRIPTION OF THE PREFERRED EMBODIMENTS

Figure 10:
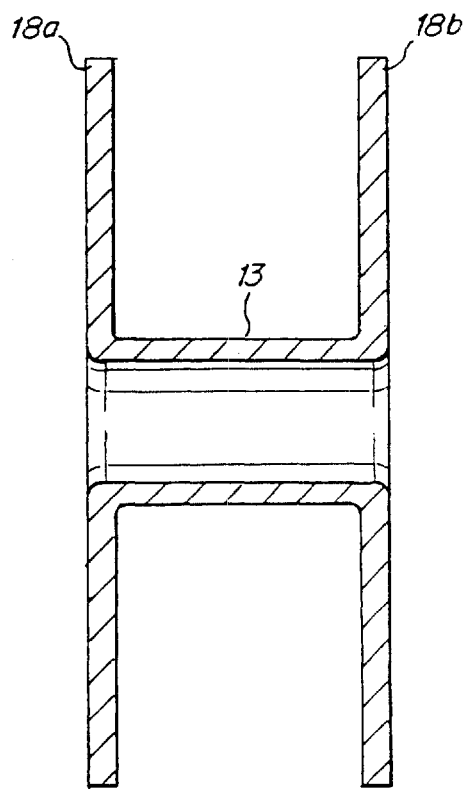
FIG. 10 is a cross sectional view showing a step (formation of flanges) of the manufacturing process of a collar according to a third embodiment.

The invention will be described in detail below with reference to the drawings, which show a part of embodiments of the invention.

FIG. 1 shows a spool valve 5 having a shaft 2 with a plurality of collars 4 (three of them being shown in the figure and suitably increased or decreased in number, as desired) fitted onto the shaft, the shaft 2 having a flange 1 on one end thereof. Here, the collars of a first embodiment described later are shown in the figure.

The respective collars 4 are formed at both ends of an inner wall $4iw$ thereof with enlarged-diameter recesses $7a$, $7b$, and small-diameter portions 8 are formed by using a rolling die to reduce a shaft stock in diameter adjacent to positions where the collars are arranged, such that plastic flow of a metallic material constituting the shaft stock extrudes the metallic material from the small-diameter portions to form a pair of annular ridges 9, which closely fit in the recesses to fix the collars to the shaft 2 to make the spool valve 5. In addition, the collars can be formed from a metal such as aluminum, steel and the like or alloys thereof, and surface hardening such as carburization or the like can be further applied to such metal as desired to give wear resistance to the same.

The spool valve 5 constituted in the above-mentioned manner is incorporated into hydraulic control circuits of automatic transmissions or the like such that it performs switching of oil flow passages by sliding of the shaft 2.

The collars 4 fixed to the spool valve 5 are surely fixed and will not become loose since the pairs of annular ridges 9 formed on peripheral surfaces of the small-diameter portions 8 of the shaft 2 are closely fitted into the collars. Besides, since carburization can be applied to the surfaces of the collars to harden the same, the collars are able to adequately withstand frequent switching actions of oil flow passages, and so switching actions of oil flow passages can be positively performed over a long term.

In addition, the enlarged-diameter recesses $7a$, $7b$ are related to the annular ridges 9 such that they are not substantially tapered but stepped. Also, of course, the enlarged-diameter recesses $7a$, $7b$ may not be formed on the collars 4 and pairs of annular ridges 9 abutting against both end surfaces of the collars may be instead formed on peripheral surfaces of the small-diameter portions 8 of the shaft 2.

Collar According to a First Embodiment

FIG. 5 shows a collar 4 according to a first embodiment, which comprises an outer wall $40w$ and an inner wall $4iw$, respectively, the both walls being formed of the same material and integrally connected at their one ends to each other (the reference numeral $4c$ denote connections). In addition, a space between the outer wall and the inner wall is an annular gap 3.

Manufacture of the collars can be made in the following manner:

First, a metallic sheet 10 having a predetermined thickness (for example, around 1 mm) is cold or warm drawn into a U-shaped configuration from above by a working machine such as a press or the like (see FIG. 2, An arrow in the figure indicates a direction, along which drawing is performed). Subsequently, a central portion of the sheet is pressed from below to be drawn in an opposite direction, whereby a central hole 11 is formed (although at this time, an enlarged-diameter recess $7a$ is simultaneously formed, an operation such as pressing by a tool die may be performed if the desired configuration of the enlarged-diameter recess is requested. Also, in this operation, the annular gap 3 is formed between the outer wall and the inner wall. See FIG. 3. An arrow in the figure indicates a direction, along which drawing is performed when the central hole is formed), and a metallic sheet 12 at a central portion is punched by a punch (See FIG. 4), and further an enlarged-diameter recess $7b$ is formed by pressing a tool die on an upper end of the central hole 11 where the metallic sheet at the central portion is punched (See FIG. 5). Formation of the enlarged-diameter recesses $7a$, $7b$ can be also made by grinding or machining, and further the collars manufactured in this manner can be given wear resistance by heat treatment such as carburization or the like.

Collar According to a Second Embodiment

FIG. 9 shows a collar 16 according to a second embodiment, which comprises an outer wall $40w$ (correctly, composed of portions $4ow_1$ and $4ow_2$) and an inner wall $4iw$, respectively, the both walls being formed of the same material and integrally connected at predetermined positions (while in the figure the positions are axially central as a matter of convenience, they are preferably leftward in the figure in view of mounting of the collar to the shaft) to each other (the reference numeral $4c$ denotes a connection, which is correctly composed of portions $4c_1$ and $4c_2$. As shown in the figure, the connection assumes a configuration, in which the sheet-shaped member $4c_1$ and the sheet-shaped member $4c_2$ abut against at their front surfaces or rear surfaces. Here, "sheet-shaped member" means that a cross sectional configuration is sheet-shaped. The same applied to the following.). In addition, in this embodiment, an annular gap 3 is defined between the outer wall $4ow_2$ and the inner wall $4iw$ (as shown in the figure, the inner wall defining the annular gap assumes a configuration, in which the sheet-shaped member $4iw_1$ and the sheet-shaped member $4iw_2$ are formed of the same material and connected integrally at one ends $4cc$ thereof to each other, and front surfaces or rear surfaces thereof abut against each other).

Manufacture of the collars can be made in the following manner:

In this embodiment, a metallic sheet 10 having a predetermined length is first wound to provide a metallic pipe 13, or a seamless pipe, a seam welded pipe or the like is cut to a predetermined length to prepare a metallic pipe 13 (see FIG. 6).

The inner wall $4iw$ is formed by caulking the metallic pipe 13 in a direction of diameter reduction to form a V-shaped or U-shaped constricted portion 14 (See FIG. 7. In the figure, arrows indicate a direction of caulking.), then restraining the metallic pipe at both ends thereof to have inner walls of the constricted portion closely attached to each other, punching oil drain holes 15 through the inner walls by means of a punch as desired (See FIG. 8. In the figure, an arrow indicates a direction of restraining), and further using a tool die to bend the constricted portion, in which the inner walls are closely attached, into a L-shape. As a result, a collar 16 is manufactured, which has the annular gap 3 between the inner wall and the outer wall $4ow_2$ (See FIG. 9). Both ends of the inner walls are rounded as the result of the metallic pipe 13 being folded with a certain curvature, whereby the enlarged-diameter recesses $7a$, $7b$ are formed. Like the first embodiment, additional work may be applied to the corners or the both ends to have the same assuming a desired shape. The collar 16 in this embodiment can be made much high in yield of material since only metal in a portion where the oil drain hole 15 is formed is discarded.

Collar According to a Third Embodiment

Figure 12:
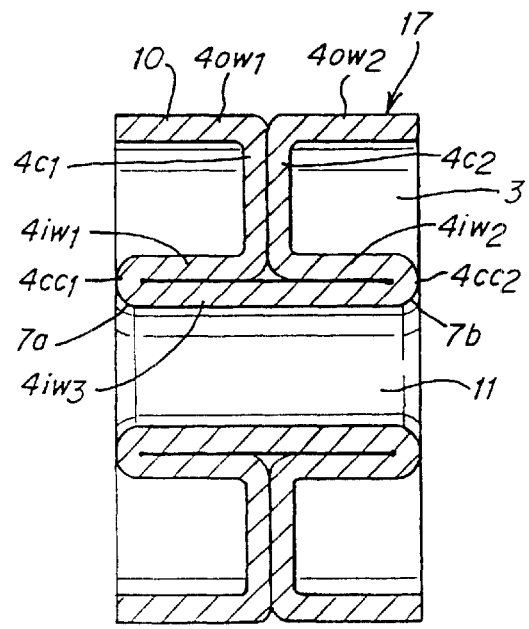
FIG. 12 is a cross sectional view showing a collar according to the third embodiment.

FIG. 12 shows a collar 17 according to a third embodiment, which comprises an outer wall $4ow$ (correctly, composed of portions $4ow_1$ and $4ow_2$) and an inner wall $4iw$ (correctly, composed of portions $4iw_1$, $4iw_2$, $4iw_3$), respectively, the both walls being formed of the same material and integrally connected at predetermined positions (being axially central in the figure) to each other (the reference numeral 4c denotes a connection, which is correctly composed of portions $4c_1$ and $4c_2$. As shown in the figure, the connection assumes a configuration, in which the sheet-shaped member $4c_1$ and the sheet-shaped member $4c_2$ abut against at their front surfaces or rear surfaces). In addition, in this embodiment, an annular gap 3 is defined between the outer wall $4ow_1$ and the inner wall $4iw_1$ and between the outer wall $4ow_2$ and the inner wall $4iw_2$ (as shown in the figure, the inner walls defining the annular gap assume a configuration, in which the sheet-shaped members $4iw_1$, $4iw_2$ and the sheet-shaped member $4iw_3$ are substantially formed of the same material and connected integrally at both ends $4cc_1$, $4cc_2$ thereof to each other, and front surfaces or rear surfaces thereof abut against each other).

Manufacture of the collars can be made in the following manner:

Like the second embodiment, in this embodiment, a metallic sheet 10 having a predetermined length is first wound to provide a metallic pipe 13, or a seamless pipe, seam welded pipe or the like is cut to a predetermined length to prepare a metallic pipe 13 (see FIG. 6).

Figure 11:
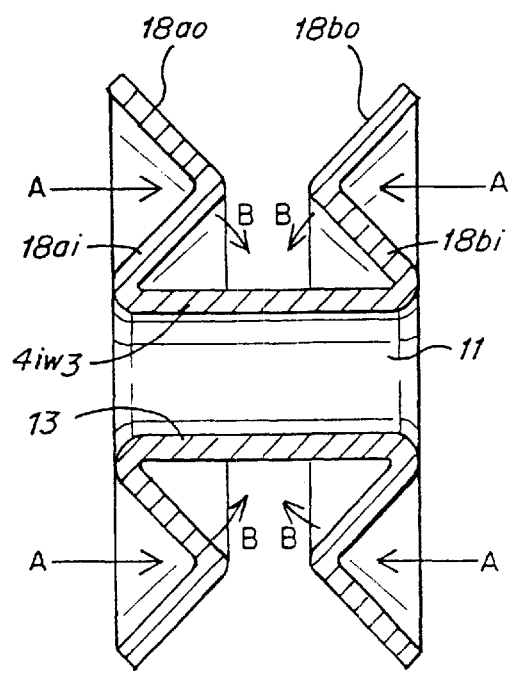
FIG. 11 is a cross sectional view showing a step (first bending of the flanges) subsequent to the step shown in FIG. 10.

The outer walls $4ow_1$, $4ow_2$ are formed by using cold pressing to form flange portions 18a, 18b at both ends of the metallic pipe 13 (See FIG. 10), then applying bending to the flange portions (See FIG. 11. In the figure, arrows indicate directions of work, and letters A, B indicate the order of work), making portions 18ao, 18bo, which have been originally outer peripheral portions of the flange portions, portions 18ai, 18bi, which have been originally inner peripheral portions of the flange portions, and a portion, which has been originally a central portion of the metallic pipe (eventually becomes a portion $4iw_3$, of the inner wall. In addition, what is made to abut against a portion of the inner wall to finally constitute other portions $4iw_1$, $4iw_2$ of the inner wall is the above-mentioned portions 18ai, 18bi), respectively, abut against each other, and further applying bending (in a direction, in which the portions are partially spaced away from each other) to a part of the portions 18ao, 18bo, which have been made to abut against each other (portions, the abutting condition of which has not been released in the last bending, finally make connections $4c_1$, $4c_2$ between the outer walls and the inner wall). As a result, the collar 17 having the annular gaps 3 between the inner walls $4iw_1$, $4iw_2$ and the outer walls are manufactured (See FIG. 12). In addition, the process of formation of the enlarged diameter recesses 7a, 7b is the same as in the second embodiment, and formation of the oil drain hole 15 and the necessity or not of additional works are also optional like those in the second embodiment. The collar 17 in this embodiment can be also made much high in yield of material since only metal in a portion where the oil drain hole 15 is formed is discarded.

Collar According to a Fourth Embodiment

Figure 15:
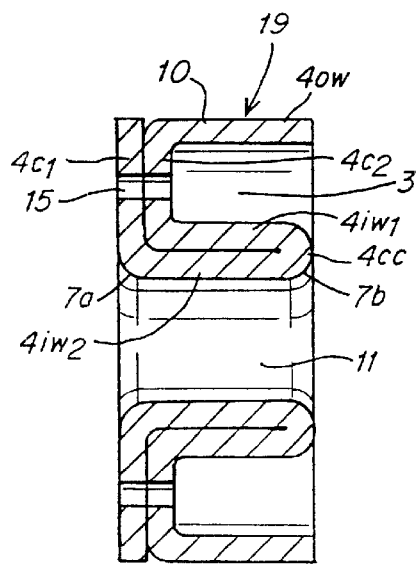
FIG. 15 is a cross sectional view showing a collar according to the fourth embodiment.

FIG. 15 shows a collar 19 according to a fourth embodiment, which comprises an outer wall 40w and an inner wall 4iw (correctly, composed of portions $4iw_1$, $4iw_2$), respectively, the both walls being formed of the same material and integrally connected at one ends thereof to each other (the reference numeral 4c denotes a connection, which is correctly composed of portions $4c_1$ and $4c_2$. As shown in the figure, the connection assumes a configuration, in which the sheet-shaped member $4c_1$ and the sheet-shaped member $4c_2$ abut against at their front surfaces or rear surfaces). In addition, in this embodiment, an annular gap 3 is defined between the outer wall 40w and the inner wall $4iw_1$ (as shown in the figure, the inner wall defining the annular gap assumes a configuration, in which the sheet-shaped member $4iw_1$ and the sheet-shaped member $4iw_2$ are formed of the same material and substantially connected integrally at one ends 4cc thereof to each other, and front surfaces or rear surfaces thereof abut against each other).

Figure 13:
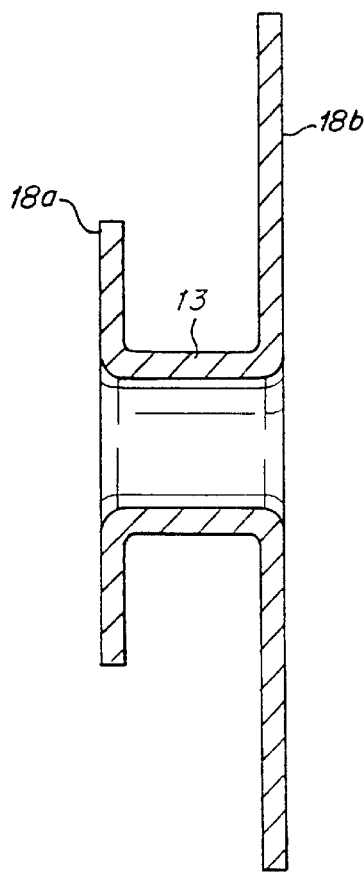
FIG. 13 is a cross sectional view showing a step (formation of flanges) of the manufacturing process of a collar according to a fourth embodiment.

Manufacture of the collars can be made in the following manner:

Like the third embodiment, in this embodiment, a metallic pipe 13 having a predetermined length (See FIG. 6) is first prepared, and then cold pressing is used to form flange portions 18a, 18b at both ends of the metallic pipe (See FIG. 13). Unlike those in the third embodiment, however, the both flange portions are such that one (18b in the figure) of them is made large and the other (18a in the figure) of them is made small.

Figure 14:
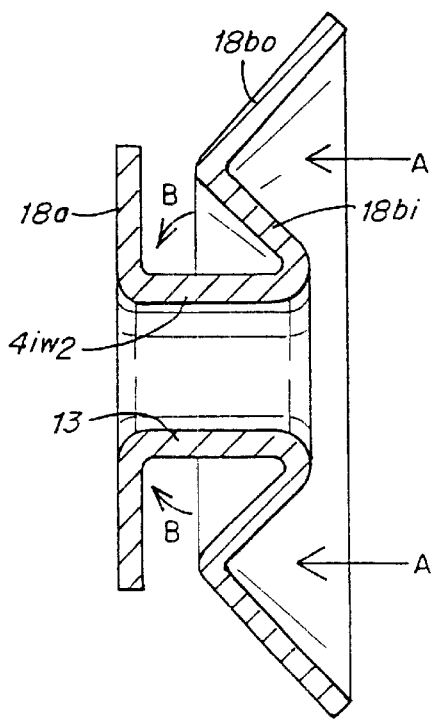
FIG. 14 is a cross sectional view showing a step (first bending of the flanges) subsequent to the step shown in FIG. 13.

The outer wall 4ow is formed by then applying bending to the flange portions, respectively (See FIG. 14. In the figure, arrows indicate a direction of work, and letters A, B indicate the order of work), making a portion 18ao, which has been originally an outer peripheral portion of one of the flange portions, and the other 18a of the flange portions, and a portion 18bi, which has been originally an inner peripheral portion of one of the flange portions, and a portion, which has been originally a central portion of the metallic pipe (eventually becomes a portion $4iw_2$ of the inner wall. In addition, what is made to abut against a portion of the inner wall to finally constitute another portion $4iw_1$ of the inner wall is the above-mentioned portion 18bi), respectively, abut against each other, and further applying bending (in a direction, in which the portions are partially spaced away from the other 18a of the flange portions) to a part of the portion 18bo, which has been made to abut against each other (portions, the abutting condition of which has not been released in the last bending, finally make a portion $4c_2$ of connections between the outer wall and the inner wall). As a result, the collar 19 having the annular gap 3 between a portion $4iw_1$ of the inner wall and the outer wall is manufactured (See FIG. 15). In addition, the process of formation of the enlarged-diameter recesses 7a, 7b is the same as in the second embodiment, and formation of the oil drain hole 15 and the necessity or not of additional works are also optional like those in the second embodiment. The collar 19 in this embodiment can be also made much high in yield of material since only metal in a portion where the oil drain hole 15 is formed is discarded.

Collar According to a Fifth Embodiment

FIG. 18 shows a collar 20 according to a fifth embodiment, which comprises an outer wall 40w and an inner wall 4iw, respectively, the both walls being formed of the same material and integrally connected at one ends thereof to each other and being made by sheet-shaped members of the same material to abut against each other at a region of the other ends thereof (the reference numeral 4c denotes a connection, which is correctly composed of portions 4c, and $4c_2$. As shown in the figure, the other connection $4c_2$ assumes a configuration, in which a portion (region of the end) of the sheet-shaped member 40w and a portion (region of the end) of the sheet-shaped member $4c_2$ abut against each other at their front surfaces or rear surfaces). In addition, in this embodiment, an annular gap 3 is a substantially closed space.).

Manufacture of the collars can be made in the following manner:

Like the fourth embodiment, in this embodiment, a metallic pipe 13 having a predetermined length (See FIG. 6) is first prepared, and then cold pressing is used to form flange portions 18a, 18b at both ends of the metallic pipe (See FIG.

13). Unlike those in the third embodiment, however, the both flange portions are such that one (18*a* in the figure) of them is made large and the other (18*b* in the figure) of them is made small.

Then bending is applied to the flange portions, respectively (See FIGS. 16 and 17. In the figure, arrows indicate directions of work), and a portion 18*ao*, which has been originally an outer peripheral portion of one of the flange portions, and a portion 18*bo*, which has been originally an outer peripheral portion of the other of the flange portions, are caused to abut against each other (eventually the portion 18*ao* will make an outer wall, a portion 18*ai*, which has been originally an inner peripheral portion of one of the flange portions, and a portion 18*bi*, which has been originally an inner peripheral portion of the other of the flange portions, will make connections 4*c*$_1$, 4*c*$_2$, and a portion, which has been originally a central portion of the metallic pipe will make an inner wall 4*iw*). As a result, the collar 20 having the annular gap 3 between the inner wall and the outer wall is manufactured (See FIG. 18). In addition, the process of formation of the enlarged-diameter recesses 7*a*, 7*b* is the same as in the second embodiment, and formation of the oil drain hole 15 and the necessity or not of additional works are also optional like those in the second embodiment. The collar 20 in this embodiment can be also made much high in yield of material since only metal in a portion where the oil drain hole 15 is formed is discarded.

While the process of manufacture of the respective collars by the limited processing methods has been described above, it goes without saying that other processing methods can be employed, by which collars in the form shown in FIGS. 5, 8, 12, 15 and 18 can be obtained.

The collars according to the invention can be readily manufactured by using a thin metallic sheet and forming the same into a desired configuration by means of processing methods such as press or the like, and the collars and hence a spool valve can be made lightweight by forming an annular space between an inner wall and an outer wall to contribute to low fuel consumption in automobiles. Also, as compared with the case where collars are manufactured by machining rod materials and cold forging, the collars according to the invention can be made high in yield of material, and be strongly fixed to a shaft by fitting the collars at predetermined positions onto a shaft material, reducing the same in diameter by means of a rolling die and closely fitting onto the enlarged-diameter recesses of the collar a pair of annular ridges, which have been formed by the resulted plastic flow of a metallic material, thus enabling manufacture of lightweight and inexpensive spool valves.

We claim:

1. A method for manufacturing a spool valve, comprising:
    fitting a plurality of collars onto a shaft and aligning the plurality of colors in predetermined positions, said collars being formed from a metallic sheet and comprising an inner wall, an outer wall and an annular gap therebetween; and
    using a rolling die to reduce in diameter the shaft around both ends of each of the collars to cause plastic flow of material to form annular ridges at both ends of each of the collars which have a larger diameter than an inner diameter of the collars to thereby fix the respective collars to the shaft.

2. The method according to claim 1, wherein:
    at least one connection is formed at one end of the inner wall and the outer wall of each of the collars, and
    the inner wall, the outer wall, and the at least one connection are comprised of a continuous sheet-shaped material.

3. The method according to claim 2, wherein oil drain holes are formed on the collars by punching.

4. The method according to claim 1, wherein:
    at least one connection is formed on other portions than ends of the inner wall and the outer wall of each of the collars,
    the inner wall, the outer wall and the at least one connection are comprised of a continuous sheet-shaped material, and
    the inner wall and the at least one connection abut against each other at front surfaces or rear surfaces thereof through a further connection.

5. The method according to claim 4, wherein oil drain holes are formed on the collars by punching.

6. The method according to claim 1, wherein:
    at least one connection is formed on other portions than ends of the inner wall and the outer wall of each of the collars,
    the inner wall, the outer wall and the at least one connection are comprised of a continuous sheet-shaped material, and
    the inner wall and the at least one connection abut against each other at front surfaces or rear surfaces thereof through the two further connection.

7. The method according to claim 6, wherein oil drain holes are formed on the collars by punching.

8. The method according to claim 1, wherein:
    at least one connection is formed on one end of the inner wall and the outer wall of each of the collars,
    the inner wall, the outer wall and the at least one connection are comprised of a continuous sheet-shaped material, and
    the inner wall and the at least one connection abut against each other at front surfaces or rear surfaces thereof through a further connection.

9. The method according to claim 8, wherein oil drain holes are formed on the collars by punching.

* * * * *